Feb. 21, 1961    R. SPIGEL    2,972,345
RESPIRATOR

Filed Oct. 26, 1955    2 Sheets-Sheet 1

INVENTOR.
Robert Spigel
BY
Attys.

Feb. 21, 1961  R. SPIGEL  2,972,345
RESPIRATOR
Filed Oct. 26, 1955  2 Sheets-Sheet 2
Fig. 3
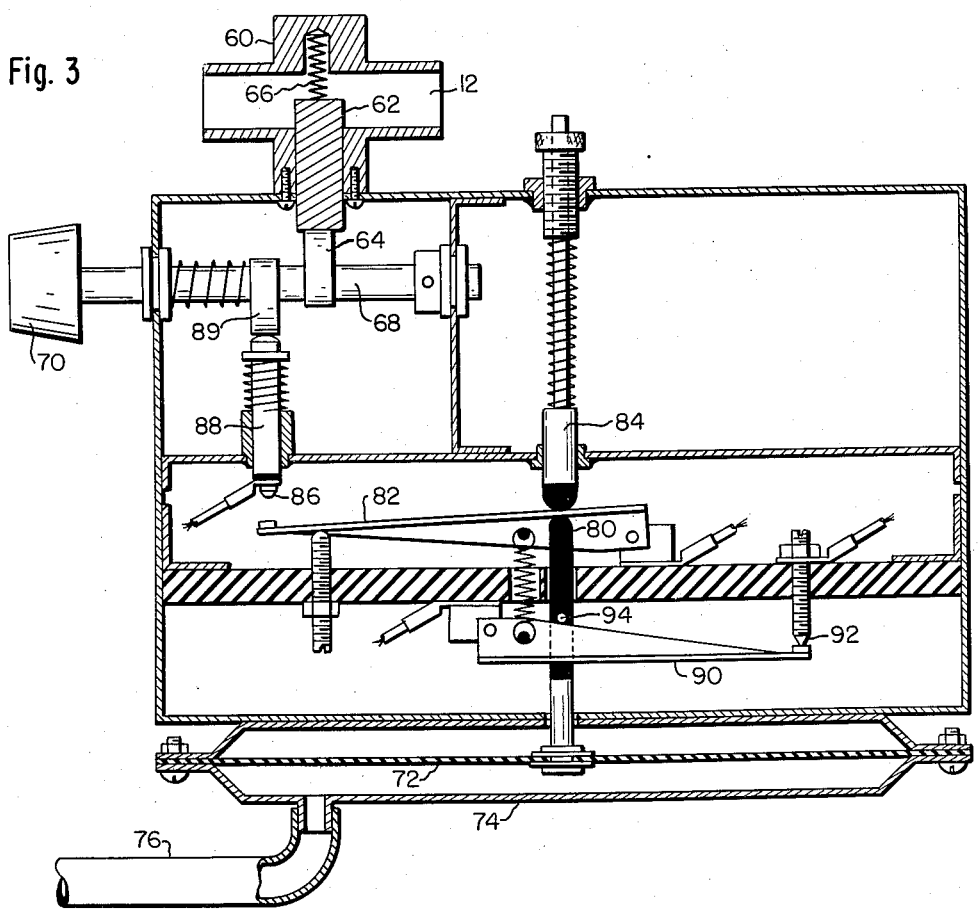
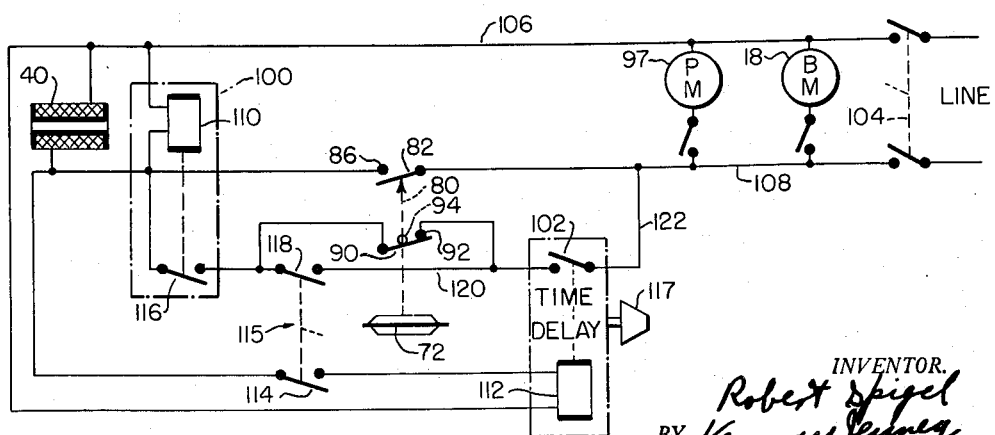
Fig. 4
INVENTOR.
Robert Spigel
BY Kenway Jenney
Witter Hildreth
Attys.

United States Patent Office 2,972,345
Patented Feb. 21, 1961

2,972,345
RESPIRATOR

Robert Spigel, Waltham, Mass. (% Eliot Medical Plastics Inc., 429 Washington St., Lynn, Mass.)

Filed Oct. 26, 1955, Ser. No. 542,954

9 Claims. (Cl. 128—29)

The present invention relates to respirator apparatus. The principal object of the present invention is to provide a breathing unit capable of being operated for a variety of purposes: for example, intermittent positive pressure breathing with either timed or demand exhalation, exsufflation or simulated cough, and resuscitation, with or without introduction of therepeutic aerosols or other agents.

With this object in view, the present invention comprises the respirator apparatus hereinafter described and particularly defined in the claims.

Figure 1:
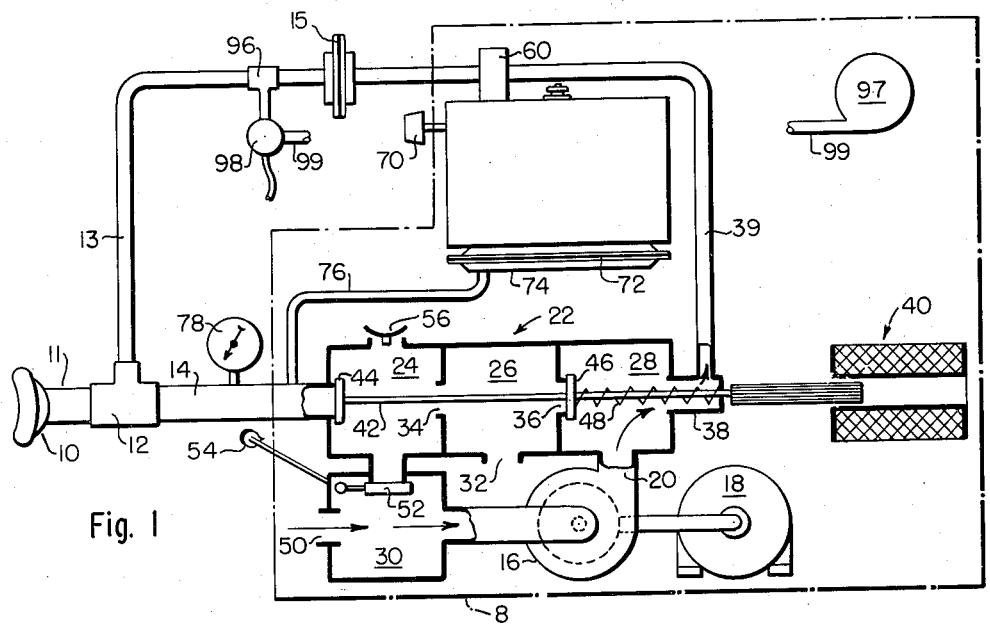
Figure 2:
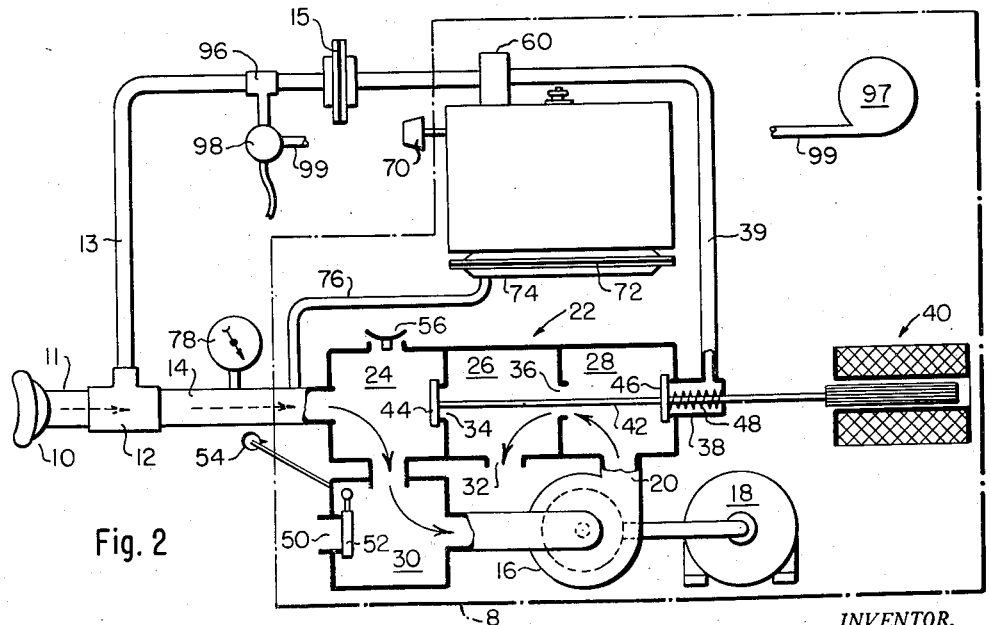

In the accompanying drawings, Fig. 1 is a diagram of the apparatus according to the preferred form of the invention;

Fig. 2 is a diagram similar to Fig. 1 but showing the part in different positions; Fig. 3 is a sectional elevation of a part of the control equipment shown in Figs. 1 and 2; and Fig. 4 is a diagram of the electrical circuits.

The illustrated embodiment of the invention comprises a casing 8, the outline of which is indicated by dot-and-dash lines in Fig. 1. An oronasal mask 10 of any suitable form is connected by flexible tubing 11 with a manifold 12, which in turn is connected by flexible inspirator tubing 13 and a rigid exhalator tube 14 with the valve mechanism to be presently described. A filter 15 may be included in the inspirator tube 13.

A centrifugal blower 16 driven by a suitable motor 18 has its outlet connected by a tube 20 with a valve chamber which is indicated at 22. The chamber 22 has three compartments indicated at 24, 26 and 28. The exhalator tube 14 connects directly into the exhaust compartment 24, which in turn communicates through a suction control chamber 30 with the blower inlet. The blower outlet connection 20 leads into the pressure compartment 28 of the valve chamber 22. The intermediate compartment 26 has an opening 32 to atmosphere.

Compartments 24 and 26 communicate by an opening 34 in their common wall, and compartments 26 and 28 communicate by an opening 36. The pressure compartment 28 is formed with an extension 38 to which is connected a tube 39 leading to the inspirator tube 13.

A solenoid-operated control valve indicated generally at 40 is provided with a stem 42 extending lengthwise throughout the three compartments of the valve chamber 22. It is provided at its left end with a disk 44 which is adapted to close the left side of the exhaust compartment 24 where the latter connects with the exhalator tube 14, as shown in Fig. 1, or to close the opening 34 between compartments 24 and 26 when the stem 42 is moved to the right, as shown in Fig. 2.

The valve stem 42 is provided with a second disk 46 which, as shown in Fig. 1 closes the opening 36 between the intermediate compartment 26 and the pressure compartment 28, but is adapted on movement to the right to close the extension 38 of the pressure chamber and thereby to shut off pressure from the inspirator line 39, as shown in Fig. 2.

The solenoid valve is normally maintained in its position of Fig. 1 by a spring 48 and is adapted to be moved to its right hand position as shown in Fig. 2, upon energization of the solenoid.

The suction control chamber 30, which serves as an inlet chamber for the blower 16, is provided with an inlet 50 from the atmosphere. A flap valve 52 may be set to close either the inlet 50 or the connection with the exhaust compartment 24, or it may be set in an intermediate position by means of a manually operated knob 54.

The exhaust compartment 24 of the valve chamber is provided with an exhaust valve 56 adapted to open under slight pressure. Preferably the valve comprises a simple thin rubber disk which serves as a check valve to prevent flow of air into the compartment 24 from the atmosphere but to impose only a negligible back pressure against exhalation.

From the foregoing description it will be seen that with the solenoid deenergized so that the valve is in its left hand position as shown in Fig. 1, positive pressure is applied from the blower through pressure chamber 28 and extension 38 into the inspirator line 39, while the exhalator tube 14 is closed off by the valve disk 44. Upon energization of the solenoid to move the valve to the right as shown in Fig. 2, the disk 46 closes off the inspirator line 39 from the blower pressure, and the blower simply exhausts through the intermediate compartment 26 and vent 32 to atmosphere. The valve disk 44 closes the opening 34 and the exhalator tube is then connected to the exhaust compartment 24. If the flap valve 52 closes the connection between compartments 24 and 30 as shown in Fig. 1, the patient exhales in normal fashion through the compartment 24 and the exhaust valve 56. Under these circumstances the blower 16 operates idly, merely blowing air from the inlet 50 out through the vent 32.

If with the solenoid energized the flap valve 52 is in a position to close the inlet 50 as shown in Fig. 2, the patient exhales into the blower suction; in other words, a sufficient negative pressure is applied to the patient to cause exsufflation or a simulated cough. The valve 52 may be set by the knob 54 in any position intermediate to those described above, in which case an adjusted negative pressure would be obtained.

The controls by which the apparatus is cycled will now be described.

Included in the respirator line 39 is an air flow control valve 60, or flow regulator, the details of which are shown in Fig. 3. The regulator has a gate 62 manually movable by cam or eccentric 64 against a spring 66 to vary the size of the passage through which the air flows. The eccentric 64 is mounted on a shaft 68 and is adapted to be adjusted by a manually operated knob 70.

A diaphragm 72 is mounted in a chamber 74 which is connected by a line 76 with the exhalator tube 14. A gage 78 is also connected into the line 14. When the solenoid valve is in its left position as shown in Fig. 1, the diaphragm 72 responds to substantially the same pressure as is being supplied to the patient. The diaphragm 72 is connected with an actuator rod 80 which operates a contact 82 against a spring-pressed plunger 84. The contact 82 is adapted to close against a contact pin 86 carried by a spring pressed plunger 88 bearing against an eccentric 89, which is mounted on the shaft 68 and is substantially identical with the eccentric 64 except that it is displaced 180° therefrom. It will be seen that when the eccentric 64 is in its uppermost position tending to close the passage 39 by the valve 62, the contact pin 86 will then be in its lowermost position, whereas when the eccentric 64 is set to provide full opening of the passage 12 the pin contact 86 will be set in its uppermost position. Since the motion of the movable contact 82 is resisted by the spring-pressed plunger 84, the pressure at which contacts 82, 86 close will depend on the setting of the contact 86; thus, the higher the setting of 86, the greater will be the pressure required to close the contacts. As will be described presently, closure of the contacts terminates the inspiration phase of the cycle. By reason of the dual action of eccentrics 64 and 89, the passage is nealy closed for low-pressure inflation and is wide open for maximum pressure inflation. This means that the time of inflation will not vary between excessive limits for different pressures.

The regulator also includes a second movable contact 90 which is normally closed on a fixed contact 92 but is adapted to be opened by a pin 94 on the actuator rod 80 when the diaphragm 72 is subjected to a sufficient negative pressure.

There is also provided a nebulizer. To this end the inspirator tube 13 is provided with a nebulizer manifold 96. An air pump 97 is provided within the casing and is connected to the nebulizer 98 by suitable tubing 99. It may be operated to introduce therapeutic aerosols or other treating agents. When the pump is operated, the nebulizer supplies treating agent continuously. During the exhalation phase of the cycle, the treating agent fills the tube 13 up to the manifold 12, and is immediately available to the patient at the start of the inspiration phase.

As shown in Fig. 4, there are also provided a latch or holding relay 100 and a time delay relay 102 for purposes to be presently described. Fig. 4 is a wiring diagram of the apparatus and is described as follows: From the main switch 104 run the main lines 106 and 108, across which the blower motor and the air pump motor are connected with suitable individual switches. The lead 106 connects with the coil 110 of the latch relay 100, the solenoid 40 and the coil 112 of the time delay relay. The lead 108 connects through the positive pressure regulator contacts 82, 86 with the other terminals of the coil 110 and solenoid 40, and through contacts 114 of a manually operated master control switch 115 with the coil 112 of the time delay relay.

The time delay relay is of any suitable form and is not shown in detail; it suffices to say that it has normally closed contacts which are caused to open after energization of its coil 112 for a predetermined time. The amount of time delay may be regulated by a manual adjusting device indicated diagrammatically at 117.

The pin contact 86 of the positive pressure regulator is connected through the normally open contacts 116 of the latch relay 100 through an additional pair of contacts 118 of the master control switch 115 and thence by lead 120 to the contacts of the time delay relay 102 and finally by a lead 122 back to the contact 82 of the regulator contacts. The negative pressure regulator contacts 90, 92 are bridged across the contacts 118 of the master control switch.

From Figs. 3 and 4 it will be seen that when the pressure in the diaphragm chamber 74 increases to such a point that the contacts 82, 86 close, the solenoid 40 is energized, thereby shifting the solenoid valve to the right and cutting off the supply pressure. Even though this results in immediate opening of the contacts 82, 86, the solenoid nevertheless remains energized because the latch relay 100 was energized during the momentary closure of 82, 86. The energizing circuit for the solenoid is now traced as follows: From 82 through 122, the contacts of time delay relay 102, the normally closed contacts 92 and the latch relay contacts 116 to the solenoid.

Deenergization of the solenoid to permit reintroduction of pressure into the system can be accomplished in either of two ways. First, to deenergize the solenoid on a time-cycle the master control switch 115 is closed. Contacts 114 bring current into the time delay relay coil 112 simultaneously with energization of the solenoid 40. After the time interval which is preset by the manual control 117 the time delay relay switch opens and thus breaks the circuit leading to the solenoid 40, thereby deenergizing the solenoid as well as the coils 110 and 112.

The second mode of deenergizing the solenoid depends upon the demand. For this operation the master control switch 114, 118 is opened, thereby rendering the time delay relay 102 inoperative. Under such conditions the circuit to the solenoid is closed through the normally closed contacts of the time delay relay, and also through the normally closed negative pressure regulator contacts 92. Upon occurrence of a slight negative pressure in the diaphragm chamber 74 the pin 94 operates on contact 90 to open the circuit leading to the solenoid 40 and the latch relay coil 110.

The operations of the apparatus will now be described in detail. The apparatus may be operated generally in three different ways as follows:

(1) With intermittent positive pressure breathing on inspiration, for bronchospastic disorders, such as bronchial asthma and pulmonary emphysema.

(2) Exsufflation with rapid negative pressure, as a means of producing a cough for removal of bronchopulmonary secretions.

(3) For resuscitation.

For intermittent positive pressure breathing, the pressure of inflation and the time of inspiration are adjusted by means of the control 70. As heretofore noted, operation of the control varies the height of the contact pin 86, thereby varying the pressure at which contacts 82, 86 are made. At the same time the gate valve 62 in the flow passage is adjusted whereby for low pressures the flow rate is reduced and therefore the time of inspiration is increased with respect to the time that would be required if the flow rate control were not provided. The pressure is variable from substantially zero to 40 cm. while the time of inspiration is in the range of approximately 1 to 3 seconds. Upon reaching the preset positive pressure the contacts 82, 86 open, thus deenergizing the solenoid and shifting the valve to its right-hand position and cutting off the supply. The exhalation tube 14 now opens into the compartment 24, and the patient exhales into the compartment 24. For passive exhalation the valve 52 is closed in its upper position so that the exhalation occurs through the valve 56. For exhalation under negative pressure the valve 52 is closed against the inlet 50 or is placed in an intermediate position as will later be described.

As described above in connection with the wiring diagram of Fig. 4, the latch relay 100 retains the solenoid 40 energized during the period of exhalation.

For timed exhalation the master switch 115 is closed, thereby energizing the time delay relay switch so that its contacts will open after a preset period, which may be adjusted by the knob 117. The range of the exhalation period is preferably between ¼ and 6 seconds.

Instead of timed exhalation the demand exhalation system may be used. This will start the positive pressure when the patient makes a slight inspirational effort after completion of exhalation. For operation in this manner the flap valve 52 is closed in its upper position, and the master switch 115 is open; therefore the time relay contacts 102 remain closed. Upon completion of exhalation, when the patient starts inspiration he will draw a slight negative pressure in the diaphragm chamber 74, thereby opening contacts 90, 92 to open the circuit to the solenoid 40 and latch relay coil 110. Upon deenergization of the solenoid the valve moves to the left and reestablishes the positive pressure inspiration phase of the cycle.

For exsufflation the system is operated similarly to that described above for timed positive pressure breathing. This requires that the master control switch 115 be closed. Furthermore, the flap valve 52 should be set to permit communication between the exhalation compartment 24 and the inlet compartment 30 so that negative pressure is applied to the patient during the exhalation phase of the cycle. The flap valve 52 may be closed against the air inlet 50 for maximum suction effect or it may be allowed to be slightly open away from the inlet 50 to diminish the negative pressure applied to the patient. The negative pressure is adjustable from zero to 40 cm. Upon reaching the preset positive pressure the machine automatically cycles the negative pressure through the operation of the solenoid. For maximum effect the pressure may be changed from +40 to −40 cm., resulting in an expiratory volume of 6 to 7 liters per second. This simulates a cough which has the effect of loosening or removing bronchial pulmonary secretions.

For resuscitation the apparatus is set for positive pressure with timed exhalation and with the flap valve set either for no negative pressure or a slight negative pressure. The operation is started in this manner for a patient with no demostrable respiration or very shallow respiration. When the patient starts to breathe, the unit may be turned to demand operation with positive pressure inspiration and passive exhalation.

For introduction of nebulized treating agents the air pump may be started, thereby introducing a spray or mist of the agent to the inspiration tube 13 where it is available to the patient during the inspiration phase of the cycle.

Having thus described my invention, I claim:

1. Respirator apparatus comprising gas supply means, an inspirator line, inspiration cut-off means, manual means for setting said cut-off means to stop supply of gas to the inspirator upon attainment of a predetermined pressure, and additional manual means connected with said setting means to vary the rate of flow of gas through said inspirator line at a lower rate for low-pressure cut-off than for high-pressure cut-off.

2. Respirator apparatus comprising gas supply means, a pressure compartment connected with the gas supply means, an inspirator line connected with the pressure compartment, an exhaust compartment, an exhalator tube connected with the exhaust compartment, a control valve operable either to connect the pressure compartment with the inspirator line or the exhalator tube with the exhaust compartment, means operated by inspirator pressure to control the valve, suction means connected with the exhaust compartment, and a manual valve for varying the suction in the exhaust compartment.

3. Respirator apparatus comprising gas supply means, a pressure compartment connected with the gas supply means, an inspirator line connected with the pressure compartment, an exhaust compartment, an exhalator tube connected with the exhaust compartment, a control valve operable either to connect the pressure compartment with the inspirator line or the exhalator tube with the exhaust compartment, means operated by inspirator pressure to control termination of the inspirator phase and to start the exhalation phase, a check valve in the exhaust compartment to permit exhalation and to close upon the start of inhalation, and demand means operable upon negative pressure in the exhaust compartment to operate the control valve to connect the inspirator line with the pressure compartment.

4. Respirator apparatus comprising a blower having an inlet and an outlet, an inspirator line, an exhalator tube, an exhalation compartment into which the exhalator tube runs, a mask, a pressure measuring device responsive to pressure in the mask, valve means for operating the apparatus in an inspiration phase and an exhalation phase of a cycle, means operated by the pressure measuring device upon attainment of a predetermined pressure to terminate the inspiration phase and to start the exhalation phase, timing switch means and suction-operated demand means for determining the end of the exhalation phase and the start of a new inspiration phase, and manual control means for selecting between said timing means and demand means.

5. Respirator apparatus comprising a blower having an inlet and an outlet, an inspirator line, an exhalator tube, an exhalation compartment into which the exhalator tube runs, a mask, a pressure measuring device responsive to pressure in the mask, positive pressure contacts operable upon attainment of a positive pressure, negative pressure contacts operable upon occurrence of a negative pressure in the mask, valve means operating in one position to connect the blower outlet with the inspiration and in another position to connect the blower inlet with the exhalation compartment, electrical connections including said positive pressure contacts and negative pressure contacts for controlling operating of said valve, means operated upon by the positive pressure contacts to change the valve from its first-named position to its other position, timing means, electrical circuit means for returning the valve to its first-named position under the control of either the timing means or the negative pressure contacts, and a master control switch for selecting timed or negative pressure return of said valve.

6. Respirator apparatus comprising gas supply means, an inspirator line, inspiration cut-off means including a pressure-controlled switch, a flow valve for controlling the rate of flow of gas through the inspirator line, setting means for the pressure-controlled switch to vary the pressure at which the cut-off means operates, and manual means for simultaneously adjusting the setting means and the flow valve.

7. In respirator apparatus having a blower, the combination of a valve chamber having a pressure compartment connected with the outlet of the blower and an exhaust compartment connected with the inlet of the blower, an inspirator line connected with the pressure compartment, an exhalator tube connected with the exhaust compartment, a solenoid-operated control valve acting in one position to close the inspirator line and in another position to close the exhalator tube, independent timing and demand means for the solenoid-operated valve, and manual means for selecting between said timing and demand means.

8. In respirator apparatus having a blower, the combination of a valve chamber having a pressure compartment connected with the outlet of the blower and an exhaust compartment connected with the inlet of the blower, an inspirator line connected with the pressure compartment, an exhalator tube connected with the exhaust compartment, an intermediate compartment between the pressure compartment and the exhaust compartment, said intermediate compartment being open to atmosphere, a solenoid-operated control valve operating in one position to close the inspirator line and to permit communication between the exhaust compartment and the blower inlet and in the other position to close the exhalator tube and open the inspirator line, independent timing and demand means for the solenoid-operated valve, and manual means for selecting between said timing and demand means.

9. In respirator apparatus having a blower, the combination of a valve chamber having a pressure compartment connected with the outlet of the blower and an exhaust compartment connected with the inlet of the blower, an inspirator line connected with the pressure compartment, an exhalator tube connected with the exhaust compartment, a suction control chamber interposed between the exhaust compartment and the blower inlet, the suction control chamber having an opening to atmosphere, a manual valve in the suction control chamber to control the suction in the exhaust compartment, and a solenoid-operated control valve operable either to connect the pressure compartment with the inspirator line or the exhalator tube with the exhaust compartment.

References Cited in the file of this patent

UNITED STATES PATENTS

| | | |
|---|---|---|
| 2,223,570 | McMillin | Dec. 3, 1940 |
| 2,288,436 | Cahan | June 30, 1942 |
| 2,391,877 | Cahan | Jan. 1, 1946 |